Jan. 14, 1941.  U. O. HUTTON  2,228,315
GAS-DELIVERY APPARATUS AND METHOD
Filed Feb. 25, 1938  4 Sheets-Sheet 1
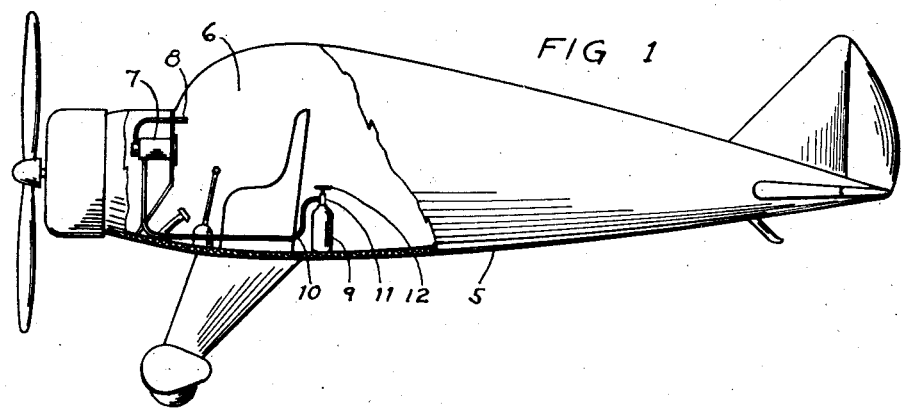
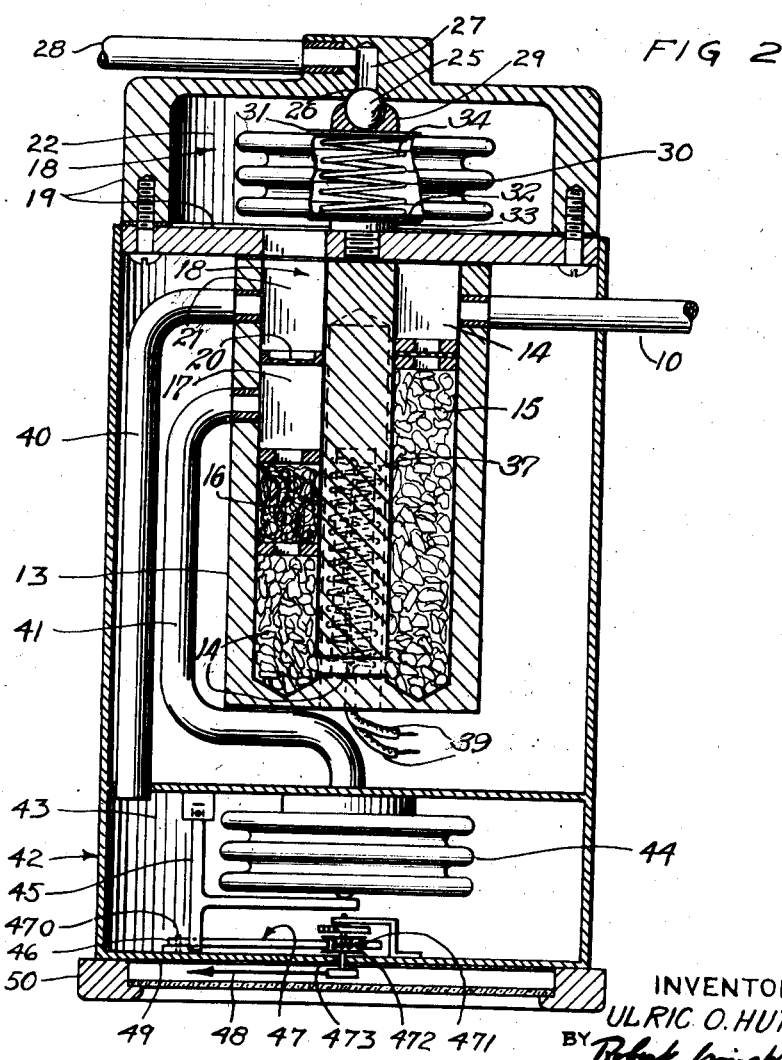
INVENTOR
ULRIC O. HUTTON
BY
ATTORNEY Jan. 14, 1941.    U. O. HUTTON    2,228,315
GAS-DELIVERY APPARATUS AND METHOD
Filed Feb. 25, 1938    4 Sheets-Sheet 2

INVENTOR
ULRIC O. HUTTON
BY Robert Irving Williams
ATTORNEY

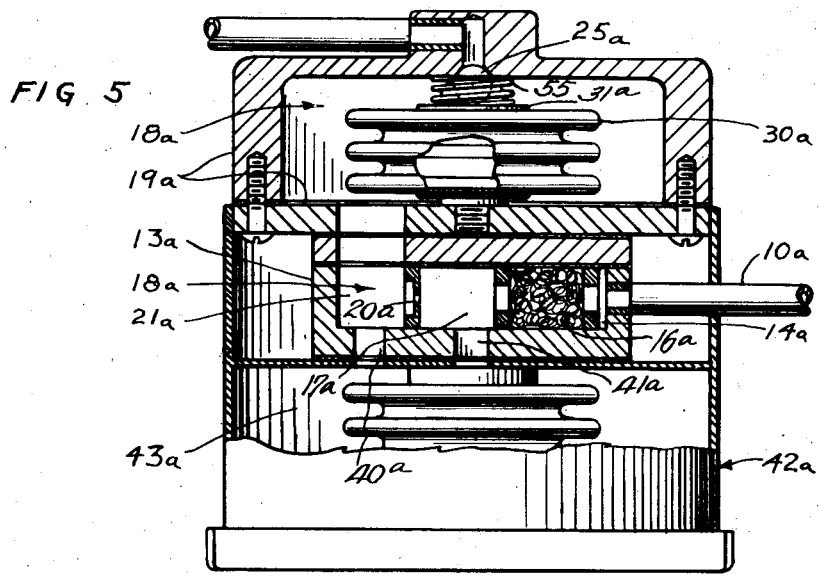

Jan. 14, 1941.   U. O. HUTTON   2,228,315
GAS-DELIVERY APPARATUS AND METHOD
Filed Feb. 25, 1938   4 Sheets—Sheet 4

INVENTOR
ULRIC O. HUTTON
BY Robert Irving Williams
ATTORNEY

Patented Jan. 14, 1941

2,228,315

UNITED STATES PATENT OFFICE 2,228,315

GAS-DELIVERY APPARATUS AND METHOD

Ulric O. Hutton, New Castle, N. Y., assignor to Cambridge Instrument Company, Inc., Ossining, N. Y., a corporation of New York Application February 25, 1938, Serial No. 192,476

12 Claims. (Cl. 128—204)

This invention relates to gas-delivery apparatus and to the art of delivering a gas, and to correlated improvements appertaining thereto, and more particularly to apparatus and methods for delivering a gas and determining and/or controlling the amount of gas being delivered under conditions wherein large variations in both temperature and pressure are encountered, as for instance, in the supply of oygxen to aircraft cockpits and the like.

An object of the invention is the provision of gas-delivery apparatus embodying means whereby the amount of gas being delivered may be determined with a high degree of accuracy under a wide variety of conditions.

A m e specific object is the provision of apparatus adapted to supply oxygen to an areonaut at altitudes encountered in aerial navigation and to accurately indicate the amount cf oxygen being delivered at all times.

A further object is the provision of gas-delivery apparatus embodying means whereby the supply of gas delivered may be controlled in an accurate manner regardless of certain external and other conditions which affect the accuracy of ordinary control means.

Another object is the provision of an improved method whereby indications of gas-flow may be obtained with a high degree of accuracy under a wide variety of conditions.

Other objects of the invention will in part be obvious and will in part appear hereinafter.

The invention accordingly comprises the features of construction, combinations of elements and arrangement of parts, and the several steps and the relation and order of one or more of such steps with respect to each of the others thereof, all of which will be exemplified hereinafter and the scope of the application of which will be indicated in the claims.

For a fuller understanding of the nature and objects of the invention reference should be had to the following detailed description taken in connection with the accompanying drawings, in which:

Figure 1 is a partly sectional side view of an airplane equipped with gas-delivery apparatus embodying the invention;

Fig. 2 is an enlarged longitudinal vertical sectional view of this apparatus;

Fig. 5 is a view similar to Fig. 2 illustrating a modified form of apparatus;

Fig. 7 is a similar view illustrating still another modification; and

Figure 4:
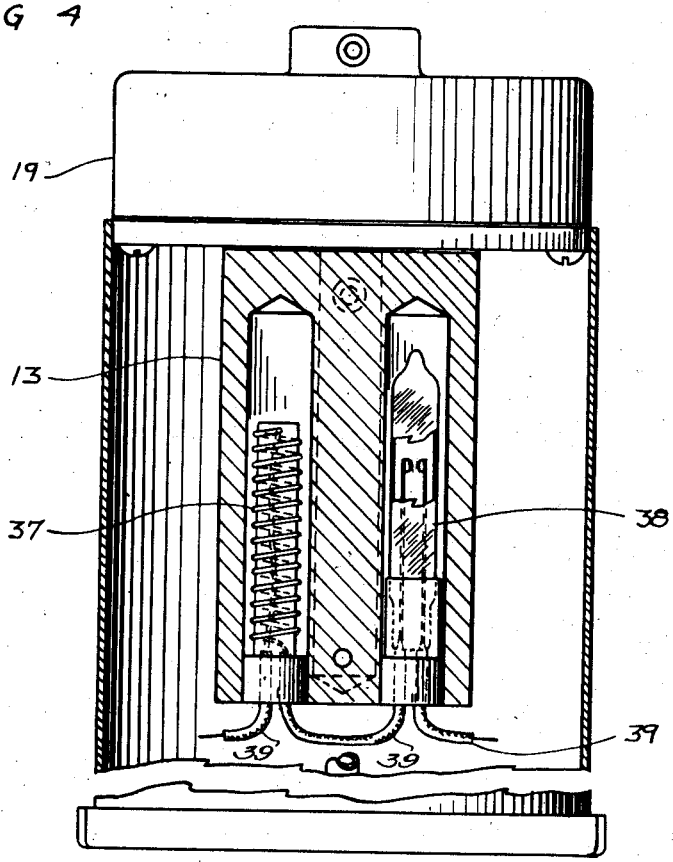
Fig. 4 is a longitudinal sectional view taken on the line 4—4 of Fig. 3.
Figure 3:
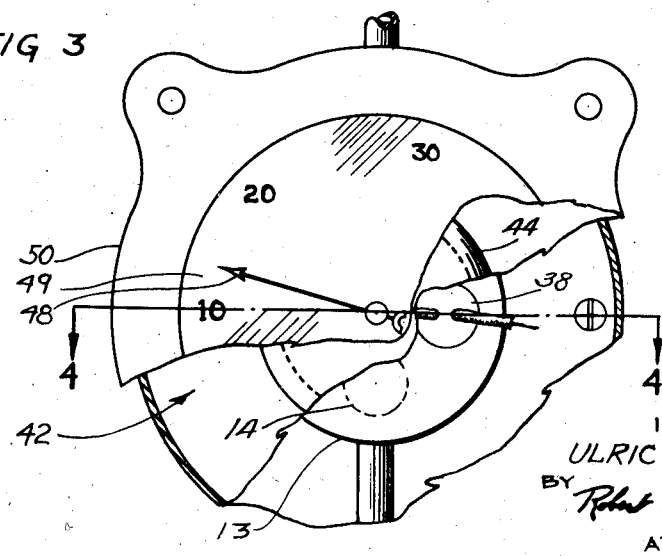
Fig. 3 is an end view of the apparatus, certain parts being broken away.

In the operation of aircraft, it is customary to compensate for the rarity of the air at high altitudes, and for other conditions, by supplying oxygen to an aeronaut, as by delivering oxygen into the cockpit of an airplane. Since lack of a proper supply of oxygen may not become apparent to the aeronaut until he begins to lose consciousness, it is of the utmost importance that the oxygen-delivery means be of such character that a proper supply of oxygen may be provided at all times when it is necessary. It it also of importance, both from a safety standpoint and a phychological standpoint that the aeronaut be assured that such delivering is being properly maintained, so that, if there is any defect in the delivery, the aeronaut may immediately take steps to remedy the defect, and so that, if the supply is proper, the aeronaut may have the assurance of this fact.

The provision of proper means and procedure for the delivery of the oxygen to an aeronaut and for the accurate indication of the amount of delivery has been a matter of considerable difficulty due to various conditions among which are the varying external temperatures and pressures encountered as the aircraft moves between different altitudes.

There are also other situations, as for instance, in tunnelling thru sand or mud where the operators have to work under high pressure to prevent the material tunnelled thru from caving in, and where other special conditions exist, where provisions for effective delivery and for an accurate indication of gas delivery, regardless of external conditions, is desirable.

With the foregoing and other considerations in view, the present invention contemplates the privision of gas delivery means and methods adapted for the accurate indication and/or control of the amount of gas being delivered regardless of variations in external pressure or temperature conditions over a wide range, and, in certain of its aspects, contemplates the provision of various improved features and arrangements.

In accordance with the invention, there may be provided gas-delivery apparatus comprising a flow line, means to maintain a substantially constant condition in a portion of the flow line, and means to measure and/or control the flow of gas into said portion. In its preferred form, such apparatus comprises means to regulate the flow of gas from such portion of the flow line, preferably by a valve operated thru the medium of a collapsible and expansible container (as for instance means of the type commonly known as a "sylphon") situated in such portion, and means to measure the difference of the pressure of the gas in such portion and the pressure of gas to be supplied to such portion. Preferably also there is provided in accordance with the invention means of such character that the gas in such portion is maintained at a constant density regardless of external temperature variations over a wide range. This may be accomplished in accordance with the invention in certain of its aspects by maintaining gas in at least one part of such portion and gas to be supplied to such portion at a constant temperature, or in accordance with the invention in certain other of its aspects by the provision of means including a sylphon filled with gas at suitable pressure and so arranged that it will maintain the gas in such portion at a pressure less than the pressure of the gas in the sylphon and that the escape of gas from said portion will be controlled to compensate for temperature- and pressure-induced tendencies for the gas in such portion to vary in density.

Further in accordance with the invention in certain of its aspects, there may be provided improved means whereby the flow of gas thru the flow line may be accurately controlled.

Also in accordance with the invention there may be provided methods whereby an accurate determination of the delivery of gas may be had regardless of external pressure and temperature conditions.

There are exemplified certain particular embodiments of the invention as considered from an apparatus standpoint; and in connection therewith the invention as considered from a method standpoint is likewise exemplified.

In Fig. 1, there is exemplified an airplane 5 having a cockpit 6, in which there is installed a gas-delivery apparatus 7 embodying the invention and adapted to deliver to the cockpit from a delivery port 8 a supply of oxygen from a pressure tank 9 mounted at a suitable point in the airplane. The flow line from the tank 9 to port 8 comprises a conduit portion 10, in which there is inserted a decompression valve 11, which may be of any well-known or suitable type of construction and which is operated by turning a knob 12. The portion 10 of the flow line extends to a metallic block 13 in which, as will be seen from Fig. 2, there are formed bores providing an elongated portion 14 of the flow line. By this the gas is carried thru heat-diffusing means 15, such as aluminum cuttings, and thru a portion 16 constituting a filter chamber, whence it discharges into a portion 17 of the flow line. Beyond this portion is a chamber 18 constituting a portion of the flow line wherein constant density conditions are provided in accordance with the invention, part of the chamber being included in a metallic housing 19, attached to block 13. The portions 17 and 18 of the flow line are connected by an orifice 20, providing a restricted channel between these portions of the line. It is to be noted in this connection that while the chamber 18 comprises a part 21 within the metallic block 13 and a part 22 within the housing 19, it constitutes in effect a single chamber of such character that pressure and density conditions within one part thereof will necessarily be similar thruout the other parts thereof and that control of the temperature and, consequently, of the density of the gas in one part will necessarily impart a similar density to the gas thruout the entire chamber.

Escape of gas from the chamber 18 is controlled by a valve member 25 arranged to be moved toward and away from a valve seat 26 provided at the sides of an opening 27 into a conduit 28 leading to the port 8. The valve 25 is carried on a holder 29 supported on one side of a sylphon device 30, which, in the present instance, is in the form of an evacuated sealed metallic capsule having an upper plate 31 to which the holder 29 is attached and a lower plate 32 mounted on a stem 33 which is secured to the lower part of the housing 19. The plates 31 and 32 are held apart by a suitably tensioned spring 34 and the entire arrangement is so formed that a desired gas pressure—such for instance as sea-level pressure—within the chamber 18 at a known temperature will be just sufficient to hold the valve 25 withdrawn from its seat an extent which will permit escape of enough gas to maintain the desired pressure within the chamber 18 at all times. In the present instance the temperature of the block 13, and consequently of the gas in the conduit portions 17 and 21, will be maintained constant. Accordingly, the density of the gas in the chamber 18, which is necessarily the same as the density of the gas in the part 21 thereof, will be maintained constant at all times, due to the action of means which maintains constant the temperature of the block and of the action of the sylphon-operated valve, and the pressures in the portion 17 and thru the channel 20 will be independent of external temperature changes. The block 13 is maintained at a constant temperature by heating means, which consists, in the present instance, of an electrical heating element 37 under control of thermostat 38, both of which are mounted within the block 13, as will be seen from Fig. 4, and are connected to each other and to a suitable source of current thru leads 39.

In accordance with the invention, means are provided to measure the difference in pressure of gas in chamber 18 and of gas entering this chamber. As exemplified this means comprises conduits 40 and 41, opening respectively into the chamber 18 and the portion 17 of the flow line, and extending to opposite sides of a barometric indicating device 42. This device consists, in the present instance, of a chamber 43 into which the conduit 40 opens and which contains a sylphon 44 into which the conduit 41 opens. Expansion or contraction of the sylphon 44 will serve, thru the medium of a lever 45, and an arm 46 of a bell-crank lever 47 pivoted at 470 and carrying a chain 471 fastened on a wheel 472, to rotate the stem 473 of a pointer 48 over a scale 49 carried on a table 50 at one end of the indicating device 42.

As will be apparent, the apparatus may be adapted to maintain any of a wide variety of pressures in the chamber 18, depending on the desiderata for particular conditions of use, and other factors. In its particularly exemplified form, the apparatus is adapted, for example, to maintain in the chamber 18 a pressure of 32 inches of mercury (absolute) at a temperature of 100° F.; the heater and thermostat in this case being arranged to heat the block sufficiently to maintain a gas in at least a portion of the chamber 18 at 100° F. This particular temperature is referred to merely by way of example, since the temperature may be maintained at any convenient point above the ambient temperatures which are expected to be encountered in the use of the apparatus. In operation, the action of the sylphon device 30 serves to maintain the pressure of the gas in the chamber 18 substantially constant during flow of gas from the portion 17 to the portion 21; and, due to the provision of the thermostatically-controlled heating element 37, the gas in the portions 17 and 18 of the flow line, as well as at 20, will be held subject to constant and similar temperature conditions. Accordingly the gas in the chamber 18 will be held at a constant density, and, since the gas in portions 17 and 18 are subject to the same temperature conditions, any change in pressure in the portion 17 which will affect the flow from portion 17 to the portion 18 will immediately and accurately be reflected by the pointer 48.

The form of apparatus exemplified in Fig. 5 is, with the exceptions below noted, the same as the form of apparatus exemplified in Figs. 1-4; the parts being indicated by similar reference numerals with the addition of the subscript $a$. In this form of construction, the electrical heating means, the thermostat, and the leads thereto are omitted or disconnected—the portion 14a which includes the filter 16a being of much less extent than the portion 14, and no heat-diffusing means being employed since it is not necessary to heat the gas therein. The portions 17a and 18a are accordingly not maintained subject to constant temperature conditions in the present instance. They are, however, maintained subject to similar temperature conditions due to the presence of the metallic casing 13a. The sylphon 30a, instead of being evacuated, is filled with air (or any suitable gas) at a pressure of about 35 to 40 inches of mercury (absolute); and instead of a spring such as 34 within the sylphon, there is provided a spring 55 extending between the top of the housing 19a and the upper plate 31a of the sylphon and tending to balance the pressure of the air within the sylphon, so that at sea-level the valve will tend to open when a pressure just above a normal sea-level pressure is present within the chamber 18a. The gas within the sylphon 30a is subject to substantially the same pressure variations with temperature as the gas in the chamber 18a so that the gas within the sylphon 30a and in the chamber 18a outside of the sylphon are each maintained at a substantially constant density due to the action of the valve 25a. The slight excess pressure within the sylphon serves to counterbalance the expanding and contracting tendencies of the metal sylphon.

In the operation of a construction such as exemplified in Fig. 5, the density of a gas in a chamber 18a will be held constant since the sylphon 30a and the gas-pressure therein will, thru the control action of the sylphon on valve 25a, hold the pressure in the chamber 18a constant as long as the temperature is constant, and, with a change in temperature, will so adjust the valve 25a that there will take place in the chamber 18a a change of pressure which will compensate for the effect of the temperature-change on density. For example, the apparatus may be so constructed that at 0° F. a pressure of 30 inches of mercury (absolute) will be maintained in the chamber 18a, whereas, if the temperature of the gas in the chamber 18a (and in the sylphon 30a) is increased to 100° F., the sylphon will then, thru the agency of the valve 25a, adjust the pressure to about 36.5 inches of mercury (absolute). Since the pressure in the portion 17a similarly increases with the increase in temperature, substantial variations in the operation of the indicating means with temperature changes are avoided. Accordingly, the apparatus will operate in a manner similar to the form of construction of Figs. 1-4 to cause a pointer corresponding to the pointer 48 to be accurately operated by the sylphon in the chamber 43a.

Figure 6:
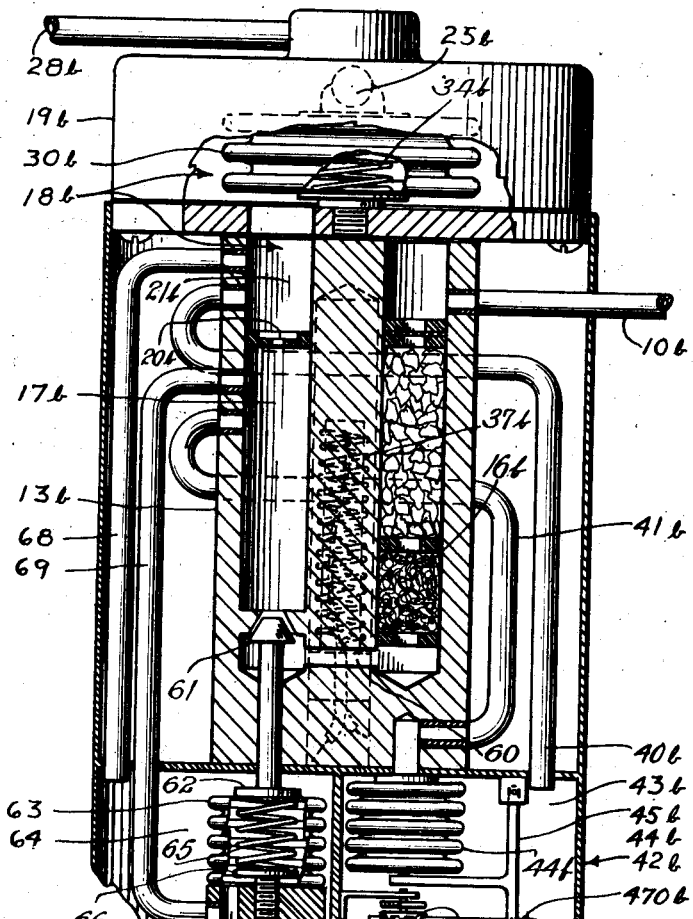
Fig. 6 is a similar view illustrating another modification.

The form of construction exemplified in Fig. 6 is similar to that exemplified in Figs. 1-4, with the exceptions below noted, similar parts being indicated by similar reference numerals with the addition of subscript $b$. In this form of construction the filter chamber 16b and the chamber 17b are spaced somewhat apart, being connected by a conduit portion 60; and a valve 61 is provided to control the flow into the supply end of the chamber 17b. This valve is carried on the movable plate 62 of a sylphon 63 contained in a chamber 64. A spring 65 extends between the plate 62 and an adjustable plate 66 which is carried on one end of a threaded stem 66' carrying a knob 67. The chamber 64 communicates with the portion 18b of the flow line thru a tube 68, and the interior of the sylphon 63 communicates with the chamber 17b thru a tube 69. The tubes 68 and 69 are of such character that the interior of the sylphon 63 is in effect a part of the chamber 17b, and that the chamber 64 is in effect a part of the portion 18b. The resiliency of the metal walls of the sylphon 63 and the tension of the spring 65 are such that by the adjustment of the knob 67 the valve 61 may be so positioned as to admit a desired flow thru the flow line, other conditions being proper. As will be apparent, a change in quantity of the gas supplied will affect the pressure in the chamber 17b, and thus the pressure in the sylphon 63 which will at once move the valve to compensate for the change in quantity and to assure a uniform flow. Moreover, since the density of the gas in the chamber 18b and, consequently, in the chamber 64 is held constant because the pressure in the chamber 18b is held constant by the operation of the sylphon 30b, and because the temperature in the portion 21b of chamber 18b is held constant by the energization of the resistance 37b, external temperature (or pressure) variations cannot affect the flow permitted by the valve 61 for any adjustment of the knob 67. Accordingly the knob can be adjusted until the indicating means 42b gives the desired indication, after which the delivery of a constant amount of gas over a wide variety of conditions in the gas-supply and in the atmosphere surrounding the apparatus, will be assured. As will be apparent also the control means will assure a constant delivery of gas regardless of mechanical irregularities, such as alterations in size of the channel between the valve and its seat when the valve is in any given position, due to the accumulation of foreign matter on the valve or its seat, or to other causes, and affecting the operation of the control valve itself.

In operation, the action of the sylphon 30b and the thermostatically-controlled heating means will maintain gas in the chamber 18b at a substantially constant density and will maintain gas in the portions 17b and 18b of the flow line, as well as at the orifice 20b, subject to constant and similar temperature conditions. Since there is no temperature variation in the gas in the portion 17b, changes in pressure of the gas in the portion 17b during the gas-flow from this portion to the portion 18b will be immediately and accurately reflected by the pointer 48b. Similarly, it will be reflected by the valve 61, since the chamber 64 and the interior of the sylphon 63 are subject to the same pressure differentials as the chamber 43b and the interior of the sylphon 44b, so that the position of the valve 61 will thereby be automatically regulated to keep the rate of flow of gas at any value that is selected by the adjustment of the knob 67.

It will be seen that the control means operates in accordance with principles similar to those in accordance with which the measuring means operates—each such means including a movable element, the movement of which is similarly regulated—and it is to be understood that the invention in its broader aspects contemplates the provision of gas delivery apparatus provided with either measuring means or control means, or both.

As will be apparent, a control means such as exemplified is adapted for use in connection with numerous types of apparatus other than that exemplified in Figs. 1–4. For example, it may be utilized in connection with gas delivery apparatus of the character exemplified in Fig. 5; one such form of apparatus embodying the control feature being exemplified in Fig. 7. In this exemplification, the construction is similar to the construction shown in Fig. 5 with the exceptions noted below; similar parts being designated by similar reference numerals with the addition of the subscript c. Where parts are similar to the parts exemplified in Fig. 6, these parts are also designated by reference numerals similar to those utilized in Fig. 6, with the addition of the subscript c. In the form of construction shown in Fig. 7, the conduit portion 10c leads to a portion 60c of the flow line, and a valve 61c, whereby the flow into the supply end of the conduit portion 17c is controlled, is provided. The stem of the valve 61c is carried on the movable plate 62c of a sylphon 63 contained in a chamber 64c. A spring 65c extends between a plate 62c and an adjustable plate 66c which is operated by a knob 67c. A chamber 64c communicates with the chamber 18c by means of a tube 68c, which in the present instance communicates with the chamber 43c of the indicating means 42c; the chamber 43c communicating in turn with the chamber 18c by means of the conduit 40c. The interior of the sylphon 63c communicates with the portion 17c of the flow line by means of a tube 69c, which in the present instance merges with the conduit 41c leading from the chamber 17c to the indicating sylphon 44c. The operation of this form of construction will be readily apparent in view of the above description of the operation of the constructions of Figs. 5 and 6.

As will be apparent, a construction such as exemplified in Fig. 7 provides a control means which will not only operate independently of external pressure and temperature conditions, of gas-supply pressures, and of irregularities affecting the operation of the control valve itself, but will also operate independently of temperature changes at the control valve and elsewhere in the apparatus, and of pressure conditions in the constant-density chamber 18c.

Figure 8:
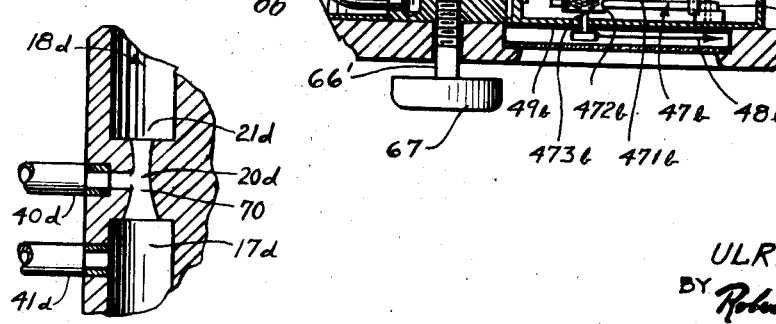
Fig. 8 is a fragmentary detail view illustrating a modified type of restricted channel.

Sylphons composed in whole or in part of rubber, glass, or other materials may be substituted for the metallic sylphons exemplified, and various other constructional details may, of course, be modified as may suit the requirements of a particular case. Instead of a measuring means of the orifice-meter character exemplified, there may, for instance, be provided measuring means of the Venturi-meter type, of the type wherein an element is lifted by the flowing gas (as, for example, mercury in a U-tube the ends of which are conduits such as the conduits 40 and 41), of the wind-mill type, etc. In each of these types the gas flows thru a channel which is restricted in one way or another, and the difference between the pressure of the gas in a chamber at the delivery end of the restricted channel and the pressure of the gas entering this chamber is measured. For example, there is exemplified in Fig. 8 a construction which may be substituted for the parts 17, 20, and 21, 17a, 20a, and 21a; etc., in any of the forms of construction hereinbefore exemplified, corresponding parts being indicated by similar reference numerals with the subscript d. In this form of construction the portion 17d of the flow line is connected with the part 21d of a chamber 18d by means of a venturi 70, providing at 20d a restricted channel; and a conduit 40d extends from the restricted channel 20d to one side of a pressure meter, from the other side of which a conduit 41d extends to part 17d. The differential in pressure between 40d and 41d may then be presented to either the indicating gage sylphon or to the regulating sylphon and results corresponding to those obtained from the differential in pressure across the orifice will be obtained.

The term "gas" as used herein is to be understood as referring to mixtures of elemental gases as well as to a gaseous fluid consisting of molecules of a single element. For example, it may be desirable in supplying oxygen to an aeronaut to supply it diluted,—as with helium or nitrogen. It is to be noted in this connection that individual constructions embodying the invention may be used in the delivery of different types of gas, it being only necessary to read the scale properly or to provide a scale which is replaceable or which is calibrated so that it can be read for any one of several gases which might be employed. It is accordingly to be borne in mind that different gases will be maintained at different densities within the constant-density chamber, but that for any given gas which may be utilized, the density within this chamber will be maintained substantially constant, by constructions such as exemplified. This density will be substantially constant for, at least, all external temperature and pressure conditions at which the device is designed to operate. A sufficiently high external pressure will, of course, blow in a valve such as exemplified, and, in the case of a heated unit, a sufficiently low external temperature may cool the block to such an extent that the heating means cannot maintain the gas at the predetermined temperature, and other special conditions may be encountered in uses for which a device is not designed. However, in all cases, the device will be operative over a wide range of external temperature and pressure conditions.

With the foregoing and other factors in view, references to constancy of density (or of temperature, pressure, or other condition) herein are, when not otherwise qualified, to be understood, not as applying to every possible condition to which the apparatus might theoretically be subjected, but as qualified by a phrase "over a wide range of external temperature and/or pressure conditions," or by some phrase of like import.

It will thus be seen that there may be provided, in accordance with the invention, indicating or control means which will operate accurately regardless of temperature or pressure variations such as encountered in airplane flight or under other conditions which render common types of meters inaccurate.

I claim:

1. In a gas-delivery apparatus, a flow line, a sealed gas-filled sylphon responsive to pressure and temperature conditions within a portion of said flow line, means controlled by said sylphon for maintaining substantially constant the density of gas in said portion during flow of gas thru said flow line in a given direction, and indicating means distinct from the aforesaid means and including means movable in response to differences in the pressure in said portion and at another point.

2. In a gas-delivery apparatus, a flow line, a sealed gas-filled sylphon responsive to pressure and temperature conditions within a portion of said flow line, means controlled by said sylphon for maintaining substantially constant the density of gas in said portion during flow of gas thru said flow line in a given direction, and indicating means distinct from the aforesaid means and including means movable in response to differences in the pressure in said portion and at another point, said sylphon being filled with gas at a pressure in excess of the gas-pressure to be maintained in said portion.

3. In an apparatus of the character described, a flow line, an outlet valve for a portion of said flow line, means responsive to a condition within said portion of the flow line to operate said valve to maintain the gas in said portion of the flow line at a substantially constant density, a calibrated scale, and means operative in accordance with the differential in pressure in said portion of said flow line and in a portion of said flow line whence gas may flow to said portion and therethru toward said outlet valve for indicating on said scale conditions within said flow line.

4. In an apparatus of the character described, a flow line, means to maintain gas in a portion of said flow line at a substantially constant density, said means comprising heating means for maintaining substantially constant the temperature of gas in at least a part of said portion and of gas to be supplied to said portion and means to maintain substantially constant the pressure in said portion, and means to measure the difference in the pressure of gas in said portion and of said heated gas to be supplied to said portion.

5. In a gas-delivery apparatus, a flow line, means to maintain a gas in a portion of said flow line at a substantially constant density, and means to measure the difference in the pressure of gas in said portion and the pressure of gas in a portion of said flow line whence gas may flow into the first-mentioned portion, said measuring means being responsive to each of said pressures.

6. In a gas-delivery apparatus, a flow line, a chamber forming a part of said flow line and having a restricted inlet channel, means to maintain a gas in said chamber at a substantially constant density, and means to measure the difference in the pressure of the gas in said chamber and the pressure of gas supplied to said chamber thru said channel, said measuring means being responsive to each of said pressures.

7. In a gas-delivery apparatus, a flow line, means to maintain a gas in a portion of the flow line at a substantially constant density, means to maintain substantially similar the temperature of gas in said portion and of gas to be delivered along said flow line to said portion and indicating means responsive to varying differentials between the gas pressure at said portion and at another point, said density maintaining means comprising a valve operated by a collapsible and expansible container located in said portion and filled with gas at such pressure that the operation of the container on the valve will maintain in such chamber a substantially-constant density over a predetermined range of temperatures therein.

8. In a gas-delivery apparatus, a flow line, a restricted channel in said flow line, means to indicate the pressure drop thru said channel, and means to render the indication of said indicating means independent of a predetermined range of pressure and temperature variations in the medium surrounding said apparatus.

9. In the art of delivering a gas, the method which comprises supplying gas to a chamber thru a restricted channel, regulating the escape of gas from said chamber and maintaining the gas in said chamber at a substantially constant density, and measuring the difference in the pressure of the gas in said chamber and the pressure of gas supplied thereto.

10. In a gas-delivery apparatus, a flow line comprising two portions separated by a restricted passageway and subject to substantially similar temperature conditions, means in one of said portions to maintain gas therein at a substantially constant density during flow of gas from the other of said portions to said one of said portions, said maintaining means comprising a valve operable by a collapsible and expansible container located within said one of said portions and filled with gas at a pressure higher than the pressure to be maintained in said one of said portions during flow of gas from said other of said portions to said one of said portions, and means to measure the difference in pressure of gas in said one of said portions and of gas in the other one of said portions.

11. In a gas-delivery apparatus, a flow line comprising two portions subject to substantially similar temperature conditions, means to maintain gas in one of said portions at a substantially constant density during flow of gas from the other of said portions to said one of said portions, said maintaining means comprising a valve operated by a collapsible and expansible container located in said one of said portions and filled with gas at a pressure in excess of the pressure to be maintained in said one of said portions during flow of gas from the other of said portions to said one of said portions, means to control the flow of gas along said flow line toward said other of said portions for discharge therefrom into said one of said portions, and means responsive to differences between the pressure of gas in said one of said portions and the pressure of gas in said other of said portions for regulating the operation of said control means.

12. In a gas-delivery apparatus, a flow line comprising two portions subject to substantially similar temperature conditions, a valve operated by a collapsible and expansible container located in one of said portions and filled with gas of such pressure that the operation of the container on the valve will maintain in said one of said portions a substantially constant density during the flow of gas from the other of said portions to said one of said portions, means to control the flow of gas toward said other of said portions for discharge therefrom into said one of said portions, and means responsive to differences between the pressure of gas in said one of said portions and the pressure of gas in said other of said portions for regulating the operation of said control means.

ULRIC O. HUTTON.